(12) United States Patent
Sugiyama

(10) Patent No.: US 11,747,748 B2
(45) Date of Patent: Sep. 5, 2023

(54) IMAGE FORMING SYSTEM, SERVER, IMAGE FORMING APPARATUS AND MANAGEMENT METHOD

(71) Applicant: BROTHER KOGYO KABUSHIKI KAISHA, Nagoya (JP)

(72) Inventor: Takashi Sugiyama, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/810,873

(22) Filed: Jul. 6, 2022

(65) Prior Publication Data

US 2022/0334510 A1 Oct. 20, 2022

Related U.S. Application Data

(63) Continuation of application No. PCT/JP2020/045638, filed on Dec. 8, 2020.

(30) Foreign Application Priority Data

Jan. 7, 2020 (JP) ................. 2020-000887

(51) Int. Cl.
*G03G 15/08* (2006.01)
*G06F 3/12* (2006.01)

(52) U.S. Cl.
CPC ......... *G03G 15/0863* (2013.01); *G06F 3/121* (2013.01); *G06F 3/1239* (2013.01); *G03G 2215/0697* (2013.01)

(58) Field of Classification Search
CPC ....... G03G 15/0863; G03G 2215/0697; G03G 15/5079; G06F 3/121; G06F 3/1239;
(Continued)

(56) References Cited

U.S. PATENT DOCUMENTS 7,369,784 B2 5/2008 Ishihara et al.
2006/0095280 A1 5/2006 Gooding
(Continued)

FOREIGN PATENT DOCUMENTS

JP 2006-267601 A 10/2006
JP 2009-3294 A 1/2009
(Continued)

OTHER PUBLICATIONS

International Search Report issued in corresponding International Patent Application No. PCT/JP2020/045638, dared Mar. 2, 2021.
(Continued)

*Primary Examiner* — Darryl V Dottin
(74) *Attorney, Agent, or Firm* — Merchant & Gould P.C.

(57) ABSTRACT

An image forming system includes an image forming and a server. The image forming device includes a controller configured to operate in accordance with a normal mode or a contract mode. The server is configured to perform transmitting, to the image forming device, an operation mode changing instruction to set an operation mode of the controller to one of a normal mode or a contract mode in accordance with an operation mode changing request. The image forming device is configured to set the operation mode in accordance with the operation mode setting instruction.

21 Claims, 10 Drawing Sheets

(58) Field of Classification Search
CPC .... G06F 3/1203; G06F 3/1229; G06F 3/1288; G06Q 10/06; B41J 29/00; B41J 29/38; B41J 29/46
USPC .......................................................... 358/1.1
See application file for complete search history.

(56) References Cited

U.S. PATENT DOCUMENTS

| | | | |
|---|---|---|---|
| 2006/0204250 A1 | 9/2006 | Ishihara et al. | |
| 2008/0316533 A1 | 12/2008 | Kawai | |
| 2012/0002983 A1* | 1/2012 | Kataoka | G03G 15/0879 399/258 |
| 2016/0288515 A1* | 10/2016 | Matsuda | B41J 2/17543 |
| 2019/0094750 A1 | 3/2019 | Kawana | |

FOREIGN PATENT DOCUMENTS

| | | |
|---|---|---|
| JP | 2012-187724 A | 10/2012 |
| JP | 2019-61057 A | 4/2019 |
| WO | 2016/158393 A1 | 10/2016 |

OTHER PUBLICATIONS

International Preliminary Report on Patentability and Written Opinion of the International Searching Authority issued in corresponding International Patent Application No. PCT/JP2020/045638, dated Jul. 12, 2022.

* cited by examiner

FIG. 3

| USER ID | DEVICE ID | PAYMENT INFORMATION | ADDRESS INFORMATION | MANAGEMENT STATUS | VALIDITY | NUMBER OF PRINTED SHEETS AT A BEGINNING OF MONTH | CURRENT NUMBER OF PRINTED SHEETS | UPPER LIMIT OF PRINTABLE SHEETS |
|---|---|---|---|---|---|---|---|---|
| User01@yyy.zzz | 123456 | (CREDIT, BANK ACCOUNT, etc.) | ZIP CODExxx-xxxx... | UNDER MANAGEMENT | VALID | 103456 | 103987 | 500 |
| User02@aaa.bbb | 213456 | (CREDIT, BANK ACCOUNT, etc.) | ZIP CODExxx-xxxx... | MANAGEMENT TERMINATED | VALID | 130 | 135 | 100 |
| User03@ccc.ddd | 151356 | (CREDIT, BANK ACCOUNT, etc.) | ZIP CODExxx-xxxx... | UNDER MANAGEMENT | INVALID | 2039 | 2247 | 300 |
| User04@eee.fff | 322356 | (CREDIT, BANK ACCOUNT, etc.) | ZIP CODExxx-xxxx... | BEFORE MANAGEMENT | | — | — | |
| User05@uuu.www | 832356 | (CREDIT, BANK ACCOUNT, etc.) | ZIP CODExxx-xxxx... | BEFORE MANAGEMENT | | — | — | |

451

IMAGE FORMING SYSTEM, SERVER, IMAGE FORMING APPARATUS AND MANAGEMENT METHOD

REFERENCE TO RELATED APPLICATIONS

This application is a continuation application based on International Patent Application PCT/JP2020/045638 filed on Dec. 8, 2020, which was filed claiming priority from Japanese Patent Application No. 2020-000887 filed on Jan. 7, 2020. The entire contents of the International Patent Application and priority application are incorporated herein by reference.

BACKGROUND ART

The present disclosures relate to an image forming system, a server, an image forming device, and a management method.

Conventionally, an image forming device is provided with various consumables. As the consumables, in addition to normal consumables, consumables used for registration of permission information and particular consumables may be provided. The consumable for the registration of the permission information typically has a memory that pre-stores permission information indicating one or more pieces of identification information. The particular consumable typically has a memory that pre-stores one piece of identification information. The image forming device itself is configured such that, when a consumable for the permission information registration is attached thereto, the image forming device obtains the permission information from the attached consumable and stores the same in a memory provided to the image forming device. When the particular consumable is attached to the image forming device, the image forming device obtains the identification information from the attached consumable and determines whether the obtained identification information matches one or more pieces of identification information indicated by the permission information stored in the above-described memory of the image forming device. When it is determined that the identification information does not match any piece of the identification information stored in the image forming device, particular functional restrictions are applied to the image forming device, while when the identification information matches one of the identification information stored in the device, the particular functional restrictions are not applied.

According to the conventional technology as described above, an operation of the device was controlled by the image forming device itself, with or without function restrictions, based on the information stored in the consumables. In recent years, for the purpose of providing a variety of services to users, a server may be configured to manage printing of an imaging device, and in such a case, technology enabling the server to control the operation of the image forming device is required.

DESCRIPTION

According to aspects of the present disclosure, there is provided an image forming system comprising a server, and an image forming device. The image forming device is configured to communicate with the server via a network. The image forming device comprises a main body, a consumable cartridge detachably attached to the main body, the consumable cartridge having a consumable memory configured to store type information indicating a particular operation mode, a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information, and a print mechanism configured to perform a printing process based on control by the controller. The server can perform an operation mode changing request obtaining process of obtaining an operation mode changing request to change an operation mode of the controller to one of the first mode and the second mode, and an operation mode changing instruction transmitting process of transmitting an operation mode changing instruction to set the operation mode of the controller to one of the first mode and the second mode in accordance with the operation mode changing request obtained in the operation mode changing request obtaining process. The controller can perform an operation mode setting process of setting of the operation mode in accordance with the operation mode setting instruction transmitted in the operation mode changing instruction transmitting process.

Further, according to aspects of the present disclosure, there is provided a server configured to communicate with an image forming device via a network and comprises. The image forming device includes a main body, a consumable cartridge detachably attached to the main body, the consumable cartridge having a consumable memory configured to store type information indicating a particular operation mode, a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information. The server can perform an operation mode changing request obtaining process of obtaining an operation mode changing request to change an operation mode of the controller to one of the first mode and the second mode, and an operation mode changing instruction transmitting process of transmitting an operation mode changing instruction to set the operation mode of the controller to one of the first mode and the second mode in accordance with the operation mode changing request obtained in the operation mode changing request obtaining process.

Further, according to aspects of the present disclosure, there is provided an image forming device configured to communicate with a server via a network. The image forming device includes a main body, a consumable cartridge detachably attached to the main body, the consumable cartridge having a consumable memory configured to store type information indicating a particular operation mode, a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information, and a print mechanism configured to perform a printing process based on control by the controller. The controller can perform an operation mode setting process of setting of the operation mode in accordance with an operation mode setting instruction to set the operation mode of the controller to one of the first mode and the second mode.

Further, according to aspects of the present disclosure, there is provided a management method for a server configured to manage an image forming device communicable with the server. The image forming device includes a main body, a consumable cartridge detachably attached to the main body, the consumable cartridge having a consumable memory configured to store type information indicating a particular operation mode, a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information. The management method includes an operation mode changing request obtaining step that the server obtains an operation mode changing request to change an operation mode of the controller to one of the first mode and the second mode, an operation mode changing instruction transmitting step that the server transmits an operation mode changing instruction to set the operation mode of the controller to one of the first mode and the second mode in accordance with the operation mode changing request obtained in the obtaining, and an operation mode setting step that the controller sets the operation mode in accordance with the operation mode setting instruction.

FIG. 3 shows an example of registration information.

Figure 1:
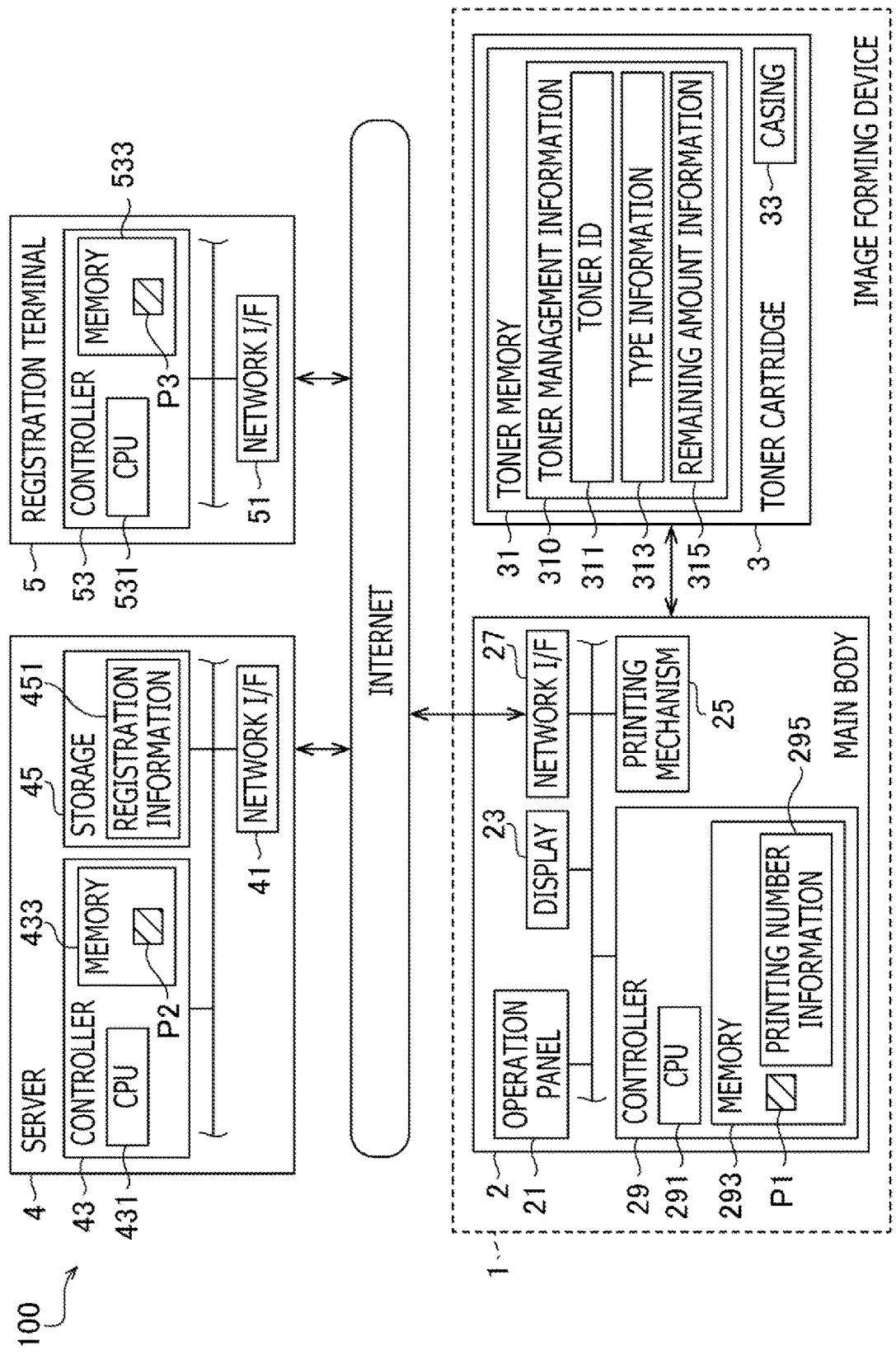
FIG. 1 is a block diagram showing an overall configuration of an image forming system.

Hereinafter, referring to the accompanying drawings, an embodiment according to the present disclosures will be described. It should be noted that components described in relation to the present embodiment are only examples, and are not intended to limit aspects of the disclosures to them. Further, in the drawings, dimensions and number of parts may be simplified as necessary for ease of understanding.

1. Embodiment

FIG. 1 is a block diagram showing an overall configuration of an image forming system 100. The image forming system 100 includes an image forming device 1, a server 4, and a registration terminal 5. The image forming device 1 and the server 4 are communicatively connected via the Internet. The server 4 and the registration terminal 5 are communicatively connected via the Internet. FIG. 1 shows a configuration where only one image forming device 1 is connected to the Internet, but multiple image forming devices 1 may be connected to the Internet.

A user of the image forming device 1 concludes a subscription contract with a vendor of consumable cartridges (concretely, a toner cartridge 3) used in the image forming device 1. The vendor then manages printing executed by the contracted image forming device 1 via the server 4. The configuration of each component of the image forming system 100 will be described below.

Configuration of Image Forming Device

The image forming device 1 is configured to execute a printing process. The image forming device 1 is configured to be connected to a LAN (Local Area Network), which is not shown in the diagram, and is a peripheral device of a computer connected to the LAN. As shown in FIG. 1, the image forming device 1 includes a main body 2 configured to execute a printing process and a toner cartridge 3 which is detachably attached to the main body and supplies toner as printing agent.

Configuration of Main Body of Image Forming Device

As shown in FIG. 1, the image forming device 1 is equipped with an operation panel 21, a display 23, a printing mechanism 25, a network I/F (interface) 27, and a controller 29. The operation panel 21 is provided with buttons configured to receive operations by the user. The display 23 is configured to display various information. The display 23 may be a so-called touch-screen panel including a transparent touch sensor overlaid on a screen of a display. In this case, the touch-screen panel may function as both the operation panel 21 and the display 23.

The printing mechanism 25 is configured to receive toner supplied from the toner cartridge 3 and execute a printing operation in accordance with an electrophotographic printing method using a laser source or LEDs as a light source. Typically, the printing mechanism 25 includes a photosensitive drum, a charging device, an exposure device, a transfer device and a heat-fixing device. The charging device is configured to charge a surface of the photosensitive drum. The exposure device is configured to irradiate a laser beam or LED light onto the charged surface of the photosensitive drum according to the image to be printed to form a latent image thereon. The transfer device is configured to transfer the toner adhered to the surface of the photosensitive drum (i.e., a toner image) onto a printing substrate such as printing sheets. The heat-fixing device is configured to fix the toner image transferred on the printing substrate by applying heat and pressure. The toner cartridge 3 according to the present disclosures is a toner cartridge having a casing 33 configured to contain the toner. The image forming device 1 is connected to the Internet via the network I/F 27.

The toner cartridge 3 is an example of a consumable cartridge that is replaceably attached to the main body 2. It is noted that, according to the present disclosure, the consumable cartridge means any cartridge that is replaceably attached to the main body 2. For example, the consumable cartridge may be a drum cartridge provided with a photosensitive drum. The drum cartridge may have a frame that allows the toner cartridge 3 to be detachably mounted. In another example, the toner cartridge 3 may be integrally provided with the photosensitive drum. Alternatively, the printing mechanism 25 may be configured to execute the printing process in accordance with an inkjet method. In such a case, the consumable cartridge may be an ink cartridge provided with a casing configured to accommodate ink. The consumable cartridge may also be a tape cassette configured to supply a tape as the printing substrate, or a fixing solution cartridge containing fixing solution for fixing ink on the printing substrate.

The controller 29 is equipped with a CPU 291 and a memory 293. In the memory 293, a program P1 is stored. The CPU 291 is configured to execute various processes according to the program P1 stored in the memory 293. The CPU 291 may be equipped with a dedicated circuit such as an ASIC (application-specific integrated circuit).

The controller 29 is configured to perform a process according to either of the two operation modes, which are a normal mode (i.e., mode 1) and a contracted mode (i.e., mode 2). The normal mode is a mode in which the server 4 does not manage printing of the image forming device 1 using the toner cartridge 3, according to the toner management information 310. The contracted mode is a mode in which the server 4 manages printing by the image forming device 1 using the toner cartridge 3, according to the toner management information 310. The program P1 defines the processing content corresponding to each of the normal mode and the contracted mode.

The memory 293 is a non-volatile memory which is, for example, a flash ROM or an EEPROM. The memory 293 is configured to store the number information 295 which indicates the number of sheets on which printing has been performed using the toner cartridge 3. The number information 295 may be created for each toner cartridge 3 installed in the image forming device 1. The controller 29 is configured to execute a process of transmitting the number information 295 to the server 4.

In the memory 293, a device ID is stored. The device ID is identification information to identify the main body 2 itself, concretely, a serial number of the main body 2.

Configuration of Toner Cartridge

Each of the toner cartridges 3 has a toner memory 31 and a casing 33. The toner memory 31 is, for example, a flash ROM or an EEPROM. In the toner memory 31, toner management information 310 (which will also be referred to as consumable management information) is stored. The toner management information 310 includes a toner ID 311, type information 313, and remaining amount information 315. The toner ID 311 is information for identifying individual toner cartridge 3, concretely a serial number. The type information 313 is information representing a specific operating mode, concretely either the normal mode or the contracted mode. The remaining amount information 315 is information representing the amount of toner remaining in the casing 33. The remaining amount information 315 is information that is decremented each time toner is used. The remaining amount information 315 may be incremented according to change of the amount of toner. The remaining amount information 315 is an example of life information representing the life of the toner cartridge 3.

Configuration of Server

The server 4 is a management server configured to manage multiple image forming devices 1. The server 4 is equipped with a network I/F 41, a controller 43, and a storage 45. The server 4 is connected to the Internet via the network I/F 41. The controller 43 is equipped with a CPU 431 and a memory 433. In the memory 433, a program P2 is stored. The CPU 431 is configured to execute various processes according to the program P2. Processes executed by the server 4 will be described later.

The storage 45 is, for example, a storage drive in which data is stored permanently, and concretely, the storage 45 may be a hard disk drive. In the storage 45, registration information 451 is stored. The registration information 451 is a database in which information about each of the image forming devices 1 is registered. The registration information 451 will be described in detail later.

Configuration of Registration Terminals

The registration terminal 5 is equipped with a network I/F 51 and a controller 53. The registration terminal 5 is connected to the Internet via the network I/F 51. The controller 53 is equipped with a CPU 531 and a memory 533. In the memory 533, a program P3 is stored. The CPU 531 is configured to execute various processes according to the program P3. The CPU 531 is configured to execute, for example, a process for requesting the server 4 to change the operation mode of the controller 29 equipped with a particular image forming device 1 (i.e., an operation mode change request transmitting processes (S11, S21) described later).

Typically, the registration terminal 5 is, for example, a communication device (e.g., a smartphone, a personal computer connected to a network, and the like) that can be operated by the user of the image forming device 1. In such a case, a vendor of the toner cartridge 3 or the like may provide the program P3 to the user as an application that runs on the communication device. It is noted that the registration terminal 5 is not necessarily limited to those operated by the user. For example, the registration terminal 5 may be configured to be operated by the vendor of the toner cartridge 3 or the administrator of the server 4 in response to a request from the user of the image forming device 1.

Exemplary Operation of Image Forming System

Figure 2:
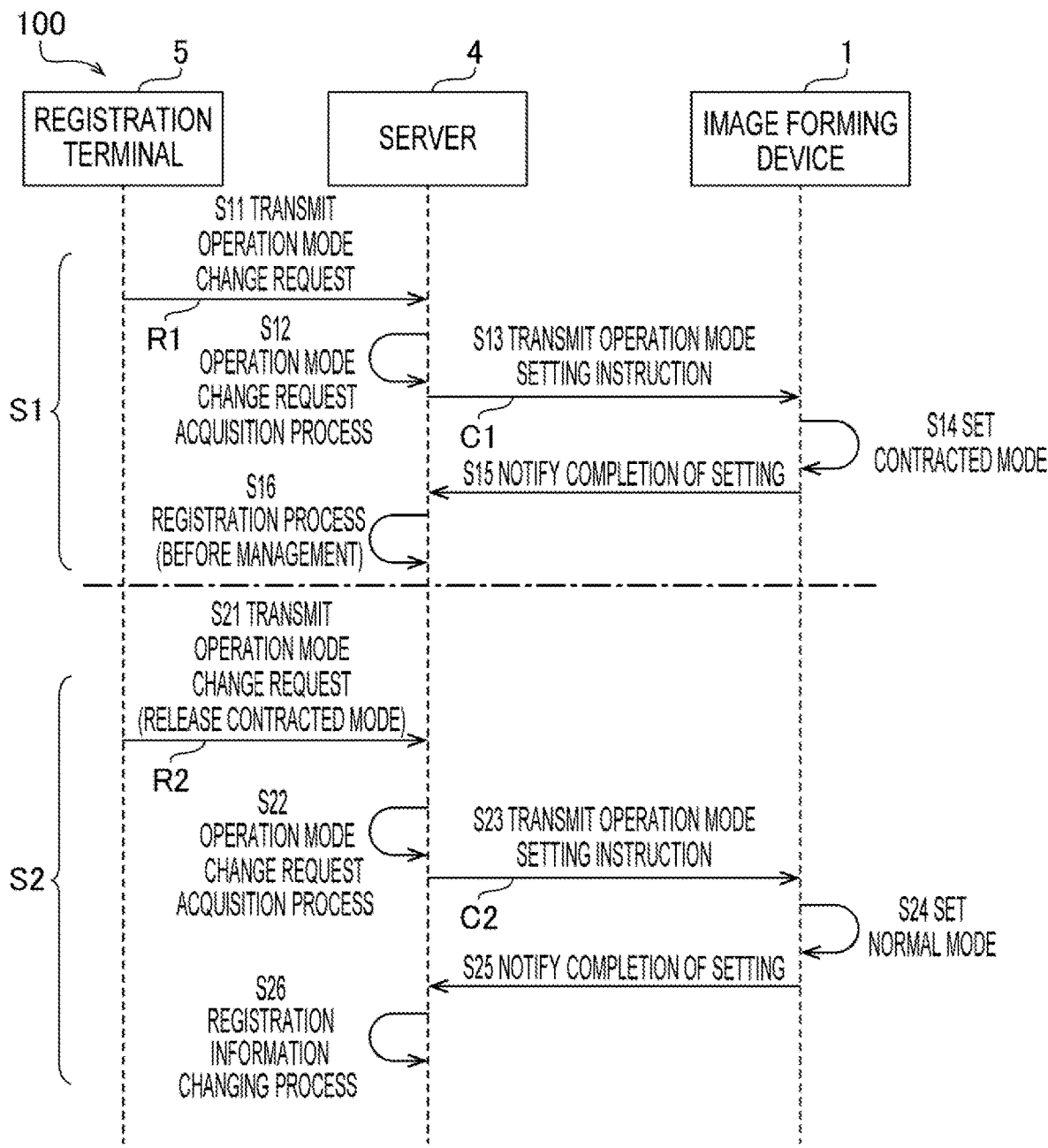
FIG. 2 is a sequence diagram showing an operation mode changing process executed in the image forming system.

FIG. 2 is a sequence diagram showing a flow of an operation mode changing process executed by the image forming system 100 according to the present embodiment. The operation mode changing process is a process to change the operation mode of the image forming system 100. The operation mode changing process includes a contracting process (S1) and a contract releasing process (S2), as shown in FIG. 2. The contracting process (S1) is a process of changing the operation mode of a target image forming device 1 from the normal mode to the contracted mode. The contract releasing process (S2) is a process of changing the operation mode of the target image forming device 1 from the contracted mode to the normal mode.

Contracting Process

In the contracting process (S1), the registration terminal 5 first executes the operation mode change request transmitting process (S11). The operation mode change request transmitting process (S11) is a process in which the registration terminal 5 transmits an operation mode change request R1 to the server 4. The operation mode change request R1 is information representing a request to change the operation mode of a particular image forming device 1 from the normal mode to the contracted mode. The operation mode change request R1 could include identification information (e.g., device serial number) of the image forming device 1 of which operation mode is to be changed to the contracted mode, user address, payment information, and the like.

After executing the operation mode change request transmitting process (S11), the server 4 executes an operation mode change request acquisition process (S12). The operation mode change request acquisition process (S12) is a process of acquiring the operation mode change request R1 transmitted from the registration terminal 5 in the operation mode change request transmitting process (S11). The operation mode change request acquisition process (S12) is a process in which the server 4 temporarily stores the identification information of the image forming device 1 included in the operation mode change request R1, a user's address, payment information included in the operation mode change request R1 in the storage 45.

After executing the operation mode change request acquisition process (S12), the server 4 executes an operation mode setting instruction transmitting process (S13). The operation mode setting instruction transmitting process (S13) is the process of transmitting a contract mode setting instruction C1 to the image forming device 1 corresponding to the operation mode change request R1. The contract mode setting instruction C1 is an instruction that causes the controller 29 of the target image forming device 1 to set the operation mode to the contracted mode.

After executing the operation mode setting instruction transmitting process (S13), when receiving a contract mode setting instruction C1, the image forming device 1 executes a contract mode setting process (S14). The contract mode setting process (S14) is a process in which the controller 29 of the image forming device 1 sets the operation mode to the contracted mode in accordance with the contract mode setting instruction C1. Hereinafter, the image forming device 1 in which the controller 29 operates in the contract mode may also be referred to as a contracted image forming device 1.

When the contract mode setting process (S14) is completed, the controller 29 executes a notification process (S15). The notification process (S15) is a process of notifying the server 4 that the operation mode has been set to the contracted mode.

When receiving a notification output in the notification process (S15), the server 4 executes a registration process (S16). The registration process (S16) is a process to register the information contained in the operation mode change request R1 which is obtained in the operation mode change request transmitting process (S11) in the memory as registration information 451.

FIG. 3 shows an example of the registration information 451. As shown in FIG. 3, to the registration information 451, for each "user ID" to identify a user, a "device ID," "payment information," "address information," "management status," "validity," "number of printed sheets at a beginning of month," "current number of printed sheets," "upper limit of printable sheets," and the like are registered. The device ID is the identification information of the image forming device 1 for which the user wishes to make a contract. The payment information is information indicating a payment method for paying fees charged by the vendor to the user. The address information represents a shipping address to which a new toner cartridge 3 is to be shipped. The management status is information representing the management status, by the server 4, of the contracted image forming device 1. The validity is information indicating the validity of the contract of the contracted image forming device 1. The number of printed sheets at a beginning of month and the current number of printed sheets are information indicating the number of sheets printed and counted. The upper limit of printable sheets indicates the upper limit of printable sheets on which printing can be performed within a particular period of time specified in the contract. The server 4 executes, for example, in the contracting process (51), a process of setting the "upper limit" (i.e., an upper limit setting process) based on the information contained in the contract mode change request R1.

Contract Releasing Process

In the contract releasing process (S2), the registration terminal 5 first executes the operation mode change request transmitting process (S21). The operation mode change request transmitting process (S21) is a process in which the registration terminal 5 transmits the operation mode change request R2 to the server 4. The operation mode change request R2 is information representing a request to change the operation mode of a particular image forming device 1 from the contracted mode to the normal mode. The operation mode change request R2 includes identification information and the like of the image forming device 1 to be changed to the normal mode.

After executing the operation mode change request transmitting process (S21), the server 4 executes the operation mode change request acquisition process (S22). The operation mode change request acquisition process (S22) is a process to acquire the operation mode change request R2 transmitted from the registration terminal 5.

After executing the operation mode change request acquisition process (S22), the server 4 executes an operation mode setting instruction transmitting process (S23). The operation mode setting instruction transmitting process (S23) is a process of transmitting a normal mode setting instruction C2 to the image forming device 1 corresponding to the operation mode change request R2. The normal mode setting instruction C2 is instruction information causing the target image forming device 1 to set the operation mode of the controller 29 to the normal mode.

After executing the operation mode setting instruction transmitting process (S23), when receiving the normal mode setting instruction C2, the image forming device 1 executes a normal mode setting process (S24). The normal mode setting process (S24) is a process of setting the operation mode of the controller 29 of the main body 2 of the image forming device 1 to the normal mode in accordance with the normal mode setting instruction C2. Hereinafter, the image forming device 1 in which the controller 29 operates in the normal mode may also be referred to as the normal-mode image forming device 1.

When the normal mode setting process (S24) is completed, the controller 29 performs a notification process (S25). The notification process (S25) is a process of notifying the server 4 that the operation mode has been set to the normal mode.

When receiving the notification in the notification process (S25), the server 4 executes a registration information changing process (S26). The registration information changing process (S26) includes, for example, a process of deleting the information of the image forming device 1 registered, in the registration process (S16), in the registration information 451.

Management Status Changing Processing

Figure 4A:
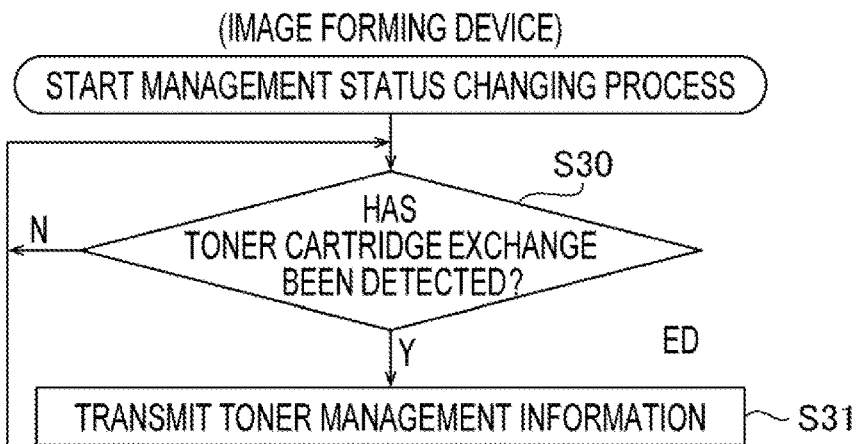
FIG. 4A is a flowchart illustrating a management status changing process executed in the image forming device.
Figure 4B:
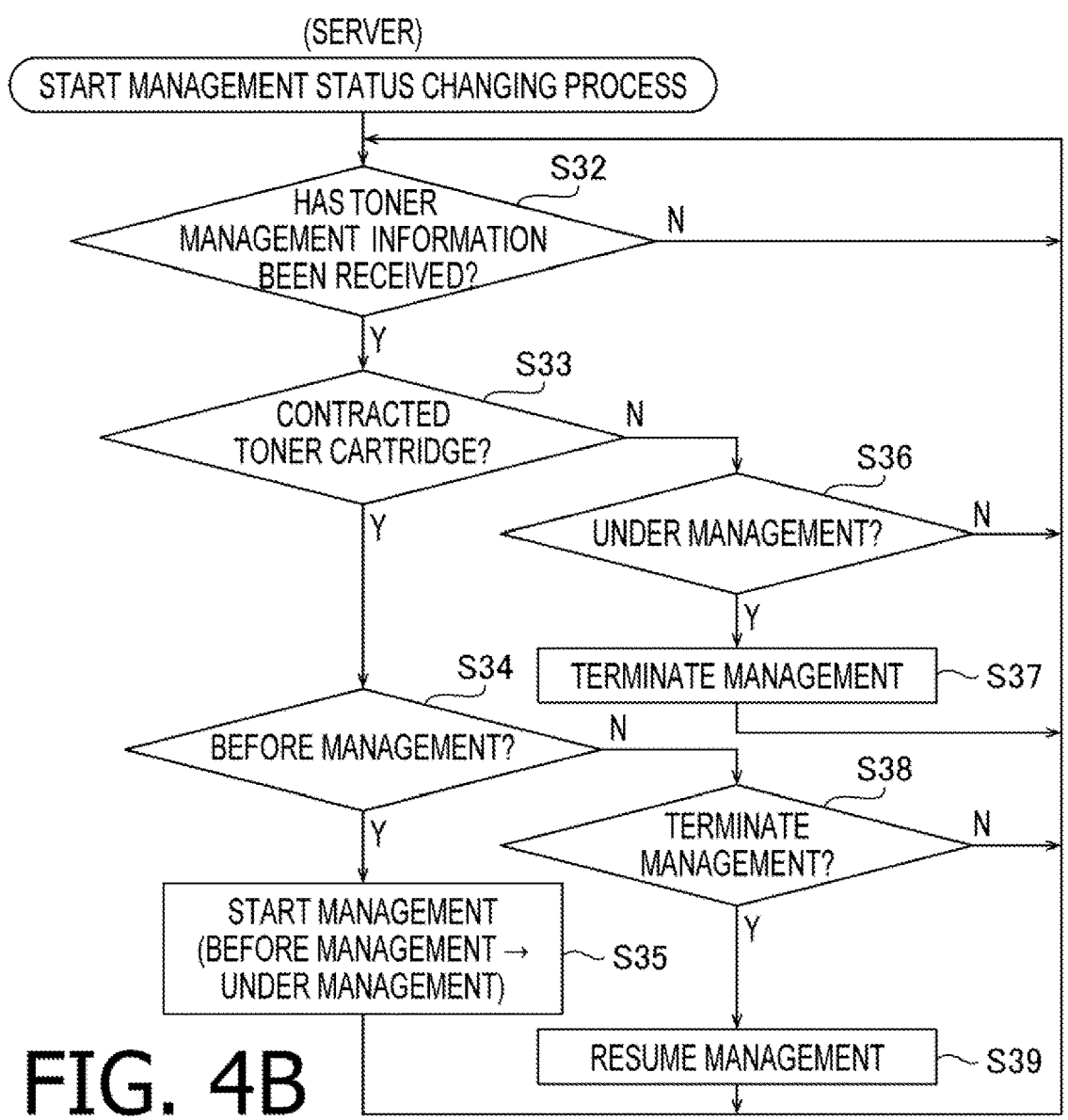
FIG. 4B is a flowchart illustrating a management status changing process executed in the server.

FIG. 4A is a flowchart illustrating a management status changing process executed in the image forming device 1, and FIG. 4B is a flowchart illustrating a management status changing process executed in the server 4. In the image forming system 100, the server 4 manages printing using the contracted toner cartridge 3 in the contracted image forming device 1. It is noted that a term "managing" concretely includes counting the number of printed sheets printed by the contracted image forming device 1. The management status changing processes shown in FIGS. 4A and 4B are processes of changing the management status of the target contracted image forming device 1 by the server 4.

Processes Executed by Contracted Image Forming Device

The controller 29 of the contracted image forming device 1 executes an exchange determining process (S30). The exchange determining process (S30) is a process of determining whether the toner cartridge 3 has been exchanged. When it is determined, in the exchange determining process (S30), that the toner cartridge 3 has been exchanged, the controller 29 executes an on-exchange transmitting process (S31). Concretely, when the power supply is switched from ON to OFF, or when the closure of the cover, which is to be opened and then closed for exchanging the toner cartridge 3, is detected by a sensor or the like, the controller 29 determines that the toner cartridge 3 has been exchanged.

The exchange determining process (S30) may include a process of determining the necessity of exchanging of the toner cartridge 3 based on the toner ID 311. In such a case, the controller 29 stores the toner ID of the toner cartridge 3 attached to the main body 2 in the memory 293. Then, when the power supply is switched from ON to OFF or when the closure of the cover is detected, the controller 29 reads out the toner ID 311 of the toner cartridge attached to the main body 2 from the toner memory 31. The controller 29 then determines whether the toner ID 311 read out from the toner memory 31 matches the toner ID 311 stored in the memory 293 in advance. When the toner ID 311 read out from the memory 31 does not match the toner ID 311 stored in the memory 293, the controller 29 determines that the toner cartridge has been exchanged. On the other hand, when the toner ID 311 read from the memory 31 matches the toner ID 311 stored in the memory 293, the control unit 29 determines that the toner cartridge 3 has not been exchanged. By executing the exchange determining process (S30), whether the toner cartridge has been exchanged or not is detected in the contracted image forming device 1.

The on-exchange transmitting process (S31) includes a process of transmitting the toner management information 310 stored in the toner memory 31 of the toner cartridge 3 attached to the main body 2 to the server 4. The on-exchange transmitting process (S31) is an example of a consumable information transmitting process. It is noted that the on-exchange transmitting process (S31) also includes a process of transmitting user information to the server 4. When the on-exchange transmitting process (S31) is completed, the controller 29 returns to the exchange determining process (S30) again.

Process of Server

The server 4 executes a reception determining process (S32) to determine whether the toner management information 310 has been received. When, in the reception determining process (S32), it is determined that the server 4 has received the toner management information 310, the server 4 executes a type determining process (S33).

The type determining process (S33) is a process of determining whether the type information 313 contained in the toner management information 310 indicates the contracted mode. When it is determined, in the type determination processing S33, that the type information 313 indicates the contracted mode, the server 4 executes a management status determining process (S34). When it is determined, in the type determining process (S33), that the type information 313 does not indicates the contracted mode, i.e., when it is determined that the type information 313 indicates the normal mode, the server 4 executes the management status determining process (S36).

The management status determining process (S34) is a process of determining the management status of the target contracted image forming device 1. In the image forming system 100, as the management statuses, a "before management" status, an "under management" status, and a "management terminated" status are included. The "before management" status is a status before the server 4 starts management of printing in the target contracted image forming device 1. The "under management" status is a status when the server 4 is currently managing the printing in the target contracted image forming device 1. The "management terminated" status is a status when the server 4 currently and temporarily suspending the management of printing in the target contracted image forming device 1.

The "before management" status means a status of the contract toner cartridge 3 before usage of the contracted cartridge 3 is started in the image forming device 1. In other words, when the contracted image forming device 1 is in the "before management" status, the normal toner cartridge 3 is used instead of the contracted toner cartridge 3. As will be described later, in the server 4, the number of printed sheets printed by the "before management" contracted image forming device 1 is not counted. As a result, the number of sheets printed by the contracted image forming device 1, but with the normal toner cartridge 3, is not counted.

The "under management" status means a status after the contracted image forming device 1 has started using the contracted toner cartridge 3. The number of sheets printed by the contracted image forming device 1 in the "under management" status using the contracted toner cartridge 3 is counted by the server 4.

When, in the management status determining process (S34), it is determined that the management status of the contracted image forming device 1 is the "before management" status (S34: YES), the server 4 executes a management starting process (S35). When the management status of the contracted image forming device 1 is not the "before management" status, the controller 29 executes the management status determining process (S38).

The management starting process (S35) is a process of changing the management status of the target contracted image forming device 1 from the "before management" status to the "under management" status. In this way, according to the image forming system 100, in the management starting process (S35), the management of the contracted image forming device 1 (concretely, the counting of the number of printed sheets) is triggered by the start of using the contract toner cartridge 3. When the management starting process (S35) is completed, the server 4 returns to the reception determining process (S32).

The management status determining process (S36) is a process of determining whether the management status of the target contracted image forming device 1 is the "under management" status. When it is determined in the management status determining process (S36) that the target contracted image forming device 1 is in the "under management" status (S36: YES), the contracted image forming device 1 executes the management terminating process (S37). On the other hand, when it is determined in the management status determining process (S36) that the contracted image forming device 1 is not in the "under management" status, the controller 29 returns to the reception determining process (S32). The management terminating process (S37) is a process of changing the management status of the target contracted image forming device 1 from the "under management" status to the "management terminated" status.

In the image forming system 100, when it is detected that the normal toner cartridge 3 is used by the contracted image forming device 1 in the "under management" status, the management status of the target contracted image forming device 1 is changed to the "management terminated" status by the management status determining process (S36) and the management terminating process (S37). Therefore, in the image forming system 100, an operation status of the server 4 is set such that the server 4 does not manage the printing performed by the target contracted image forming device 1, i.e., the server 4 does not count the number of sheets printed.

The management status determining process (S38) is a process of determining whether the management status of the target contracted image forming device 1 is the "management terminated" status. When it is determined in the management status determining process (S38) that the management status is the "management terminated" status (S38: YES), the contracted image forming device 1 executes a management resuming process (S39). When it is determined in the management status determining process (S38) that status is not the "management terminated" status, the controller 29 returns to the reception determining process (S32). The management resuming process (S39) is a process of changing the management status of the target contracted image forming device 1 from the "management terminated" status to the "under management" status.

In the image forming system 100, when the contracted printing material cartridge 3 is used in the contracted image forming device 1 that is in the "management terminated" status, the management status of the contracted image forming device 1 is changed to "under management" status in the management status determining process (S38) and the management resuming process (S39). Therefore, in the image forming system 100, the operation status of the server 4 is set to manage the printing performed by the target contracted image forming device 1, i.e., the status where the number of sheets printed is counted.

The server 4 is configured to store the date and time when the management status of the target contracted image forming device 1 was set to the "under management" in the management start process (S35), the date and time when the management status of the target contracted image forming device 1 was set to the "under management" status in the management terminating process (S37), and the date and time when the management status of the target contracted image forming device 1 was set to the "under management" status in the management resume process (S39). The server 4 records the date and time information in the registration information 451. The server 4 is equipped with a clock for recording date and time information.

Printing Process

Figure 5:
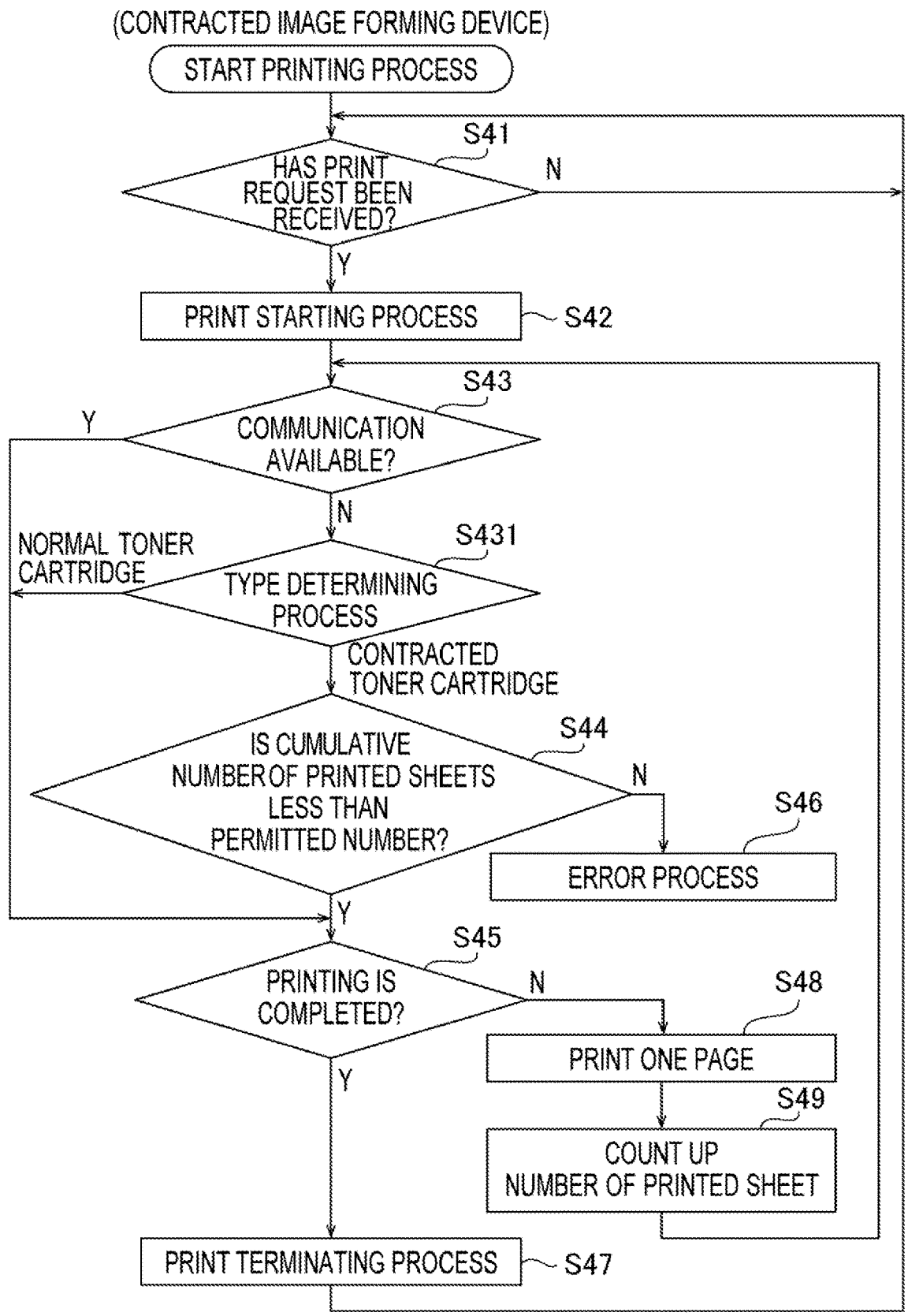
FIG. 5 is a flowchart illustrating a printing process performed by a contracted imaging device.

FIG. 5 is a flowchart illustrating a printing process executed by the contracted image forming device 1. In the printing process, the controller 29, which is in the contracted mode, is configured to execute a reception determining process (S41). The reception determining process (S41) is a process of determining whether a print request has been received via a communication channel or via the operation panel 21.

When it is determined in the reception determining process (S41) that the print request has been received, the controller 29 executes the print starting process (S42). The print starting process (S42) includes, for example, a warm-up operation necessary for the printing mechanism 25 to start printing. After the print starting process (S42) is completed, the controller 29 executes a communication determining process (S43).

The communication determining process (S43) is a process of determining whether communication with the server 4 is available. When it is determined, in the communication determining process (S43), that communication with the server 4 cannot be executed (S43: YES), the controller 29 executes the type determining process (S431). If it is determined that communication with the server 4 is not available (S43: NO), the controller 29 skips a number of printed sheets determining process (S44) and executes the completion determining process (S45).

The type determining process (S431) is a process of determining the type of the toner cartridge 3 attached to the main body 2 based on the type information 313. The type information 313 is read out from the toner memory 31 when the toner cartridge 3 is attached to the main body 2. When it is determined that toner cartridge 3 attached to the main body 2 is the contracted toner cartridge 3 (S431: Contracted Toner Cartridge), the controller 29 executes the number of printed sheets determining process in S44. When it is determined in the type determining process in S431 that the cartridge attached to the main body 2 is the normal toner cartridge 3 (S431: Normal Toner Cartridge), the controller 29 skips the number of printed sheets determining process (S44) and executes the completion determining process (S45).

The number of printed sheets determining process (S44) is a process of determining whether the cumulative number of sheets printed using the contracted toner cartridge 3 in the contracted image forming device 1 is less than a permitted number of sheets. The permitted number of sheets will be described later. When the number of printed sheets is determined to be less than the permitted number of sheets (S44: YES), the controller 29 executes the completion determining process (S45) which is a process of determining whether printing regarding the print request has been completed. When the number of printed sheets is determined to exceed the permitted number (S44: NO), the controller 29 executes an error process in S46.

The error process (S46) is a process to set the image forming device 1 in an error status. The error process includes, for example, a process of displaying a particular error screen on the display 23 or prohibiting printing by the image forming device 1. The error process (S46) places the contracted image forming device 1 in a state where the printing process using the contracted toner cartridge 3 in the contracted image forming device 1 is restricted.

When it is determined in the completion determining process (S45) that the printing process is completed (S45: YES), the controller 29 executes a print terminating process (S47). The print terminating process (S47) includes a process of restoring positions of respective components of the printing mechanism 25 to their original positions, and a process of collecting or disposing unnecessary toner and the like. The print terminating process (S47) also includes a process of updating remaining amount information 315 of the toner cartridge 3 used in the printing process. When completing the print terminating process (S47), the controller 29 returns to the reception determining process (S41).

When it is determined, in the completion determining process (S45), that printing is not completed, the controller 29 executes the printing process for one page (S48). Then, when completing the printing process for one page (S48), the controller 29 executes a count-up process (S49). The count-up process is a process of increasing a count value indicated by the number of printed sheets information 295 stored in the memory 293 by one page. When completing the count-up process (S49), the controller 29 returns to the completion determining process (S45). In this way, the printing process (S48) and the count-up process (S49) are repeatedly executed according to the number of pages to be printed.

In the count-up process (S49), the number of printed sheets information 295 corresponding to the toner cartridge 3 used in the printing process (S48) is counted up. Further, every time when printing of one page is completed, the number of printed sheets information 295 is updated. In this way, the number of printed sheets which are printed using the toner cartridge 3 identified by the toner ID 311 can be stored in the memory 293.

In the image forming system 100, when it is determined, in the communication determination processing (S43), that the contracted image forming device 1 cannot communicate with the server 4 (S43: NO), as the number of printed sheets determining process (S44) and the error process (S46) are executed, printing beyond the permitted number of sheets by the contracted image forming device 1 is restricted.

Further, when it is determined, in the type determining process (S431), that the toner cartridge is the normal toner cartridge 3 (S431: Normal Toner Cartridge), the controller 29 skips the number of printed sheets determining process (S44). Therefore, when the normal toner cartridge 3 is used in the contracted image forming device 1, the normal printing process can be executed.

Scheduled Transmitting Process

Figure 6A:
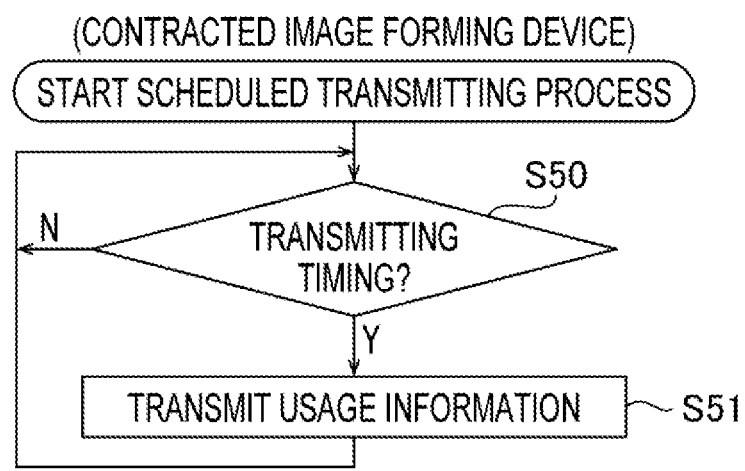
FIG. 6A is a flowchart illustrating a scheduled transmitting process executed by the image forming device.
Figure 6B:
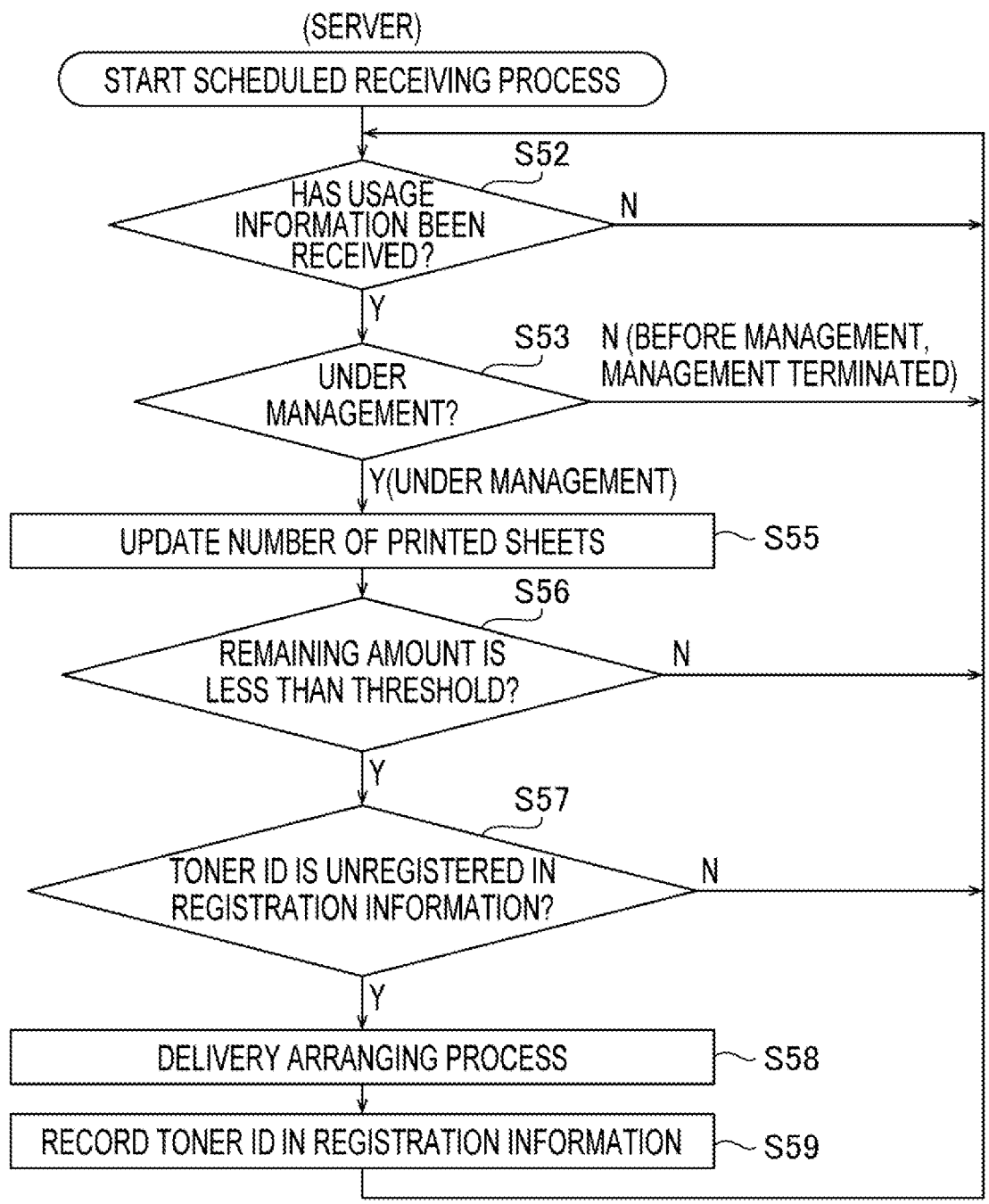
FIG. 6B is a flowchart illustrating a scheduled receiving process executed by the server.

FIG. 6A is a flowchart illustrating a scheduled transmitting process executed by the image forming device 1 and FIG. 6B is a flowchart illustrating a scheduled receiving process executed by the server 4. In the following description, the scheduled transmitting process and the scheduled receiving process are also referred collectively to as a scheduled transmission/reception process. The scheduled transmission/reception process is a process of periodically executing the transmission/reception of information representing the usage status of the contracted image forming device 1 (hereinafter referred to as "usage information") between the contracted image forming device 1 and the server 4. The usage information includes, for example, toner management information 310 and number of printed sheets information 295.

Processing of Contracted Image Forming Device

The controller 29 of the contracted image forming device 1 executes a timing determining process (S50). The timing determining process (S50) is a process of determining whether or not it is a timing at which the usage information is to be transmitted to the server 4. For example, since the usage information is transmitted at a fixed cycle, a timing when the fixed cycle has elapsed is determined to be the timing at which the usage information is to be transmitted to the server 4. Alternatively, the controller 29 may determine that the transmission timing has been reached when particular conditions are met. Concretely, the controller 29 may determine a timing at which printing has been completed in the contracted image forming device 1 (S45: YES) as the timing at which the usage information is to be transmitted to the server 4. Further alternatively, the controller 29 may determine a timing at which the cumulative number of printed sheets which are printed in the contracted image forming device 1 exceeds the particular number of printed sheets may be used as the timing for transmission.

When it is determined, in the timing determining process (S50), that the timing at which the usage information is transmitted to the server 4 has been reached, the controller 29 performs a usage information transmitting process (S51). The usage information transmitting process (S51) is a process of transmitting a usage status, including the toner management information 310 and the number of printed sheets information 295, to the server 4. The usage information transmitting process (S51) is an example of a consumable information transmitting process. The usage information transmitting process (S51) is also an example of a life information transmitting process of transmitting the remaining amount information 315 included in the usage information to the server 4. Further, the usage information transmitting process (S51) is an example of a number of printed sheets transmitting process which is a process of transmitting the number of printed sheets to the server 4.

Process Executed by Server

The server 4 executes the reception determining process (S52). The reception determining process (S52) is a process of determining whether the usage information transmitted by the controller 29 in the usage information transmitting process (S51) has been received. When it is determined, in the reception determining process, that the usage information sent by the controller 29 has been received (S52: YES), the server 4 executes a management status determining process (S53).

The management status determining process (S53) is a process of determining, based on the registration information 451, whether the management status of the target contracted image forming device 1 is the "under management" status. When the management status is determined to be the "under management" status (S53: YES), the controller 29 executes a number of printed sheets updating process (S55) (hereinafter, also referred to as a printed sheets counting process). In the number of printed sheets updating process (S55), the server 4 may also record the date and time when the number of printed sheets are counted in the registration information 451. When it is determined, in the management status determining process (S53), that the server is not in the "under management" status (i.e., in the "before management" status or the "management terminated" status), the server 4 returns to the reception determining process (S52).

The number of printed sheets updating process (S55) includes a process of updating the "current number of printed sheets" based on the number of printed sheets information 295. By executing the number of printed sheets updating process (S55), the server 4 counts the number of printed sheets printed in the contracted image forming device 1 that is in the "under management" status, thereby managing the printing of the contracted image forming device 1. For the contracted image forming device 1 that is in the "before management" status or the "management terminated" status, the number of printed sheets updating process (S55) is not executed. That is, when the normal toner cartridge 3 is used in the contracted image forming device 1, counting of the number of printed sheets by the server 4 is not executed. As a result, the number of printed sheets counting process regarding the target image forming device 1 is terminated.

When completing the number of printed sheets updating process (S55), the server 4 executes the life determining process (S56). The life determining process (S56) is a process of determining whether the life information transmitted from the contracted image forming device 1 indicates a value exceeding a preset threshold value. Concretely, the life determining process (S56) is a process of determining whether the amount of remaining toner indicated by the remaining amount information 315 in the usage information is below the preset threshold value. When the remaining toner amount is determined to be below the threshold value (S56: YES), the server 4 executes a toner ID determining process (S57). When the remaining toner amount is not below the threshold value (S56: NO), the server 4 returns to the reception determining process (S52).

The toner ID determining process (S57) is a process of determining whether the toner ID 311 included in the usage information is unregistered in the registration information 451. When it is determined, in the toner ID determining process (S57), that the toner ID 311 is unregistered (S57: YES), the server 4 executes a delivery arranging process (S58). When it is determined, in the toner ID determining process (S57), that the toner ID 311 has been registered in the registration information 451 (S57: NO), the server 4 returns to the reception determining process (S52).

The delivery arranging process (S58) is a process of requesting a delivery person to deliver a new contracted toner cartridge 3 to a user who is using the contracted toner cartridge 3 of which remaining toner level has fallen below the threshold value. The delivery address of the new contracted toner cartridge 3 is the address of the user which is registered in the registration information 451. According to the image forming system 100, a new contracted toner cartridge 3 can be delivered to the user of the contracted toner cartridge 3 of which toner level has fallen below the threshold value. Therefore, the user can receive a new toner cartridge 3 before the toner of the toner cartridge 3 is used up.

When completing the delivery arranging process (S58), the server 4 executes a toner ID recording process (S59). The toner ID recording process (S59) is a process of recording the toner ID 311 contained in the usage information is recorded in the registration information 451. As the toner ID recording process (S59) is executed, the toner ID 311 of the contracted toner cartridge 3, which is determined to contain the toner of which remaining amount, is below the threshold value is registered in the registration information 451. As a result, delivery of two or more new contracted toner cartridges 3 corresponding to the contracted toner cartridge 3 of which remaining toner amount becomes less than the threshold value at a time is effectively suppressed.

Billing Process

Figure 7:
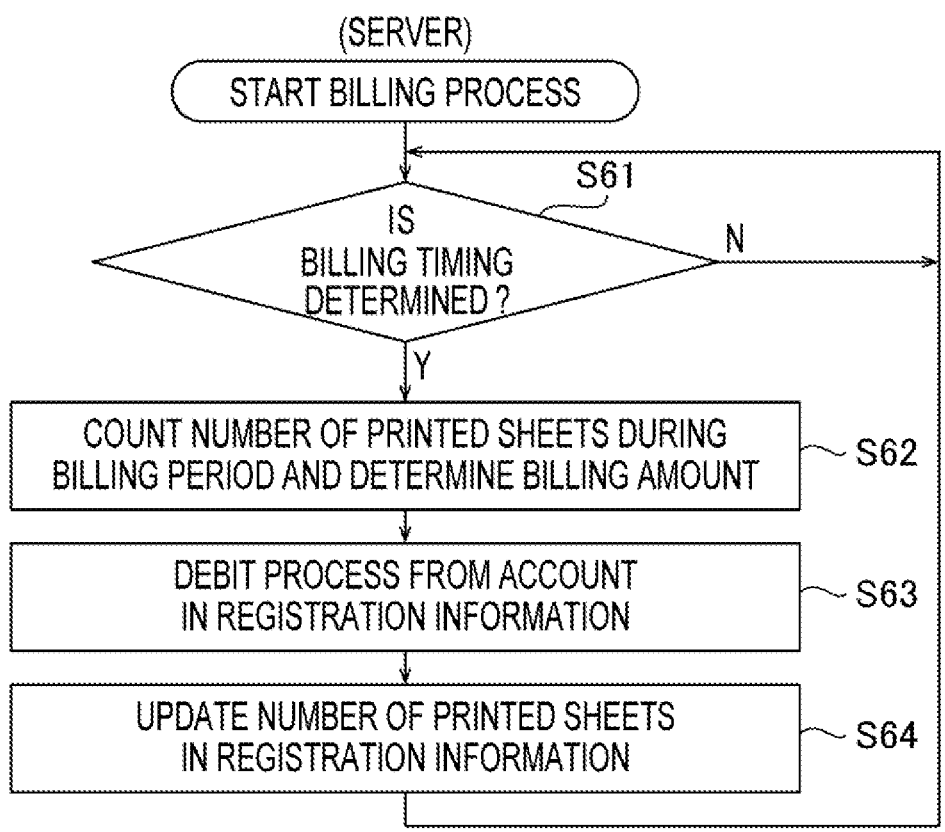
FIG. 7 is a flowchart illustrating a billing process executed by the server.

FIG. 7 is a flowchart illustrating a billing process executed by the server 4. In S61, the server 4 executes a billing timing determination. The billing timing determination in S61 is a process to determine whether the billing timing at which a billing amount should be determined has reached for each user. The billing timing can be set arbitrarily, for example, a particular day of a month such as the end of the month, or a date corresponding to the start of usage of the toner cartridge 3. When it is determined that the billing timing is determined to have reached according to the billing timing determination in S61, the server 4 executes a billing amount determining process (S62). The determination of the reach of the billing timing is based on the clock provided to the server 4.

The billing amount determining process (S62) determines the billing amount for each user. When, for example, the billing amount is to be determined according to the number of counted printed sheets, the number of printed sheets printed during a billing period is firstly determined. Concretely, in the registration information 451 shown in FIG. 3, a "current number of sheets printed" represents the current total number of sheets printed, and a "number of printed sheets at a beginning of month" represents the number of sheets printed when the billing amount was fixed previously. Therefore, a value obtained by subtracting the "number of sheets printed at the beginning of the month" from the "current number of sheets printed" is the number of printed sheets to be billed.

When the number of printed sheets calculated in the billing amount determining process (S62) is less than the upper limit of the printable number of sheets, the billing amount may be fixed regardless of the number of sheets actually printed, while when the number of printed sheets exceeds the upper limit of the printable number of sheets, a billing process may be performed to separately charge for the amount exceeding the upper limit of the printable number of sheets.

When determining the billing amount, the server 4 executes a debit process (S63). The debit process (S63) is used to debit the fixed billing amount to a user's account registered in the registration information 451. In the debit process (S63), the amount is debited from the user's account, transferred to a collector's designated account, or otherwise executed as appropriate.

When the debit process (S63) is completed, the server 4 executes the number of printed sheets updating process (S64). The number of printed sheets updating process S64 is a process of updating the "number of sheets printed at the beginning of the month" in the registration information 451 is updated to the "current number of sheets printed" for the user who performed the debit process in S63. In this way, the server 4 can start ting from the number of printed sheets for which billing has been finalized, until the next billing period reaches.

Permitted Number of Sheets Setting Process

Figure 8A:
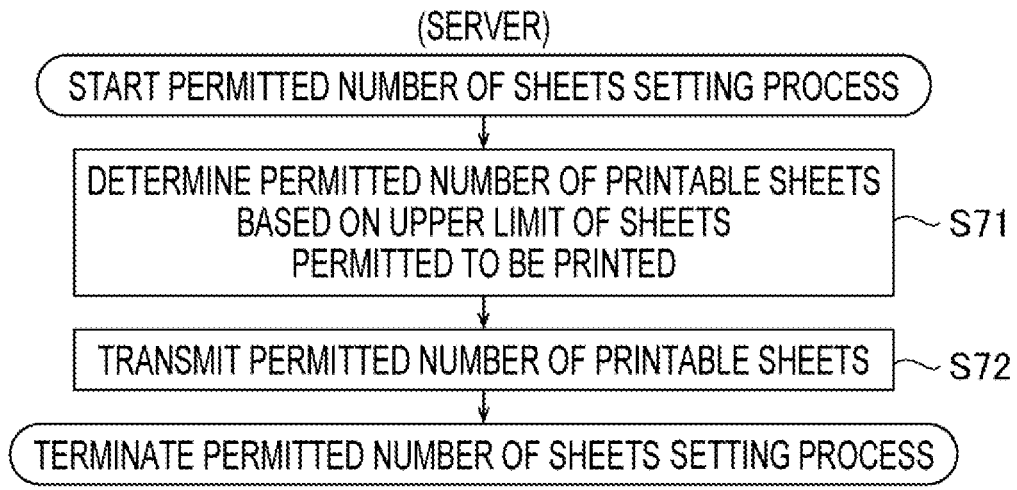
FIG. 8A is a flowchart illustrating a permitted number of sheets setting process executed by the server.
Figure 8B:
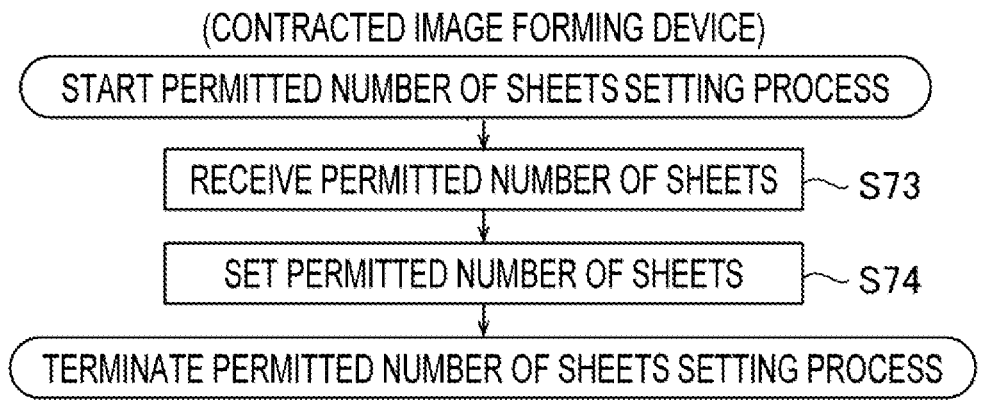
FIG. 8B is a flowchart illustrating a permitted number of sheets setting process executed by the contracted image forming device.

FIG. 8A is a flowchart illustrating a permitted number of sheets setting process executed in the server 4. FIG. 8B is a flowchart illustrating a permitted number of sheets setting process executed in the contracted image forming device 1. The permitted number of sheets setting processes shown in FIGS. 8A and 8B are processes for setting the permitted number of sheets that can be printed in the contracted image forming device 1 when the contracted image forming device 1 is unable to communication with the server 4. The permitted number of sheets setting process may be executed after the contracting process (51), but typically, before the start of the printing processing using the toner cartridge 3 in the contracted mode in the image forming device 1.

Process of Server

In the permitted number of sheets setting process, the server 4 first executes the permitted number of sheets determining process S71. The permitted number of sheets determining process S71 is a process of determining the permitted number of printable sheets based on the upper limit of sheets permitted to be printed. The permitted number of sheets may be the same as the upper limit of sheets permitted to be printed, or may be different.

When the permitted number of sheets determining process S71 is completed, the server 4 executes a transmitting process S72. The transmitting process S72 is a process of transmitting the permitted number of sheets determined in the permitted number of sheets determining process S71 to the corresponding contracted image forming device 1.

Process of Contracted Image Forming Device

The controller 29 of the contracted image forming device 1 executes a receiving process (S73). The receiving process (S73) is a process of receiving the permitted number of printable sheets transmitted by the server 4. Upon receiving the permitted number of printable sheets, the controller 29 executes the permitted number of sheets setting process S74 to set the permitted number of printable sheets. The permitted number of sheets setting process S74 includes a process of storing the received permitted number of printable sheets in the memory 293.

Figure 9A:
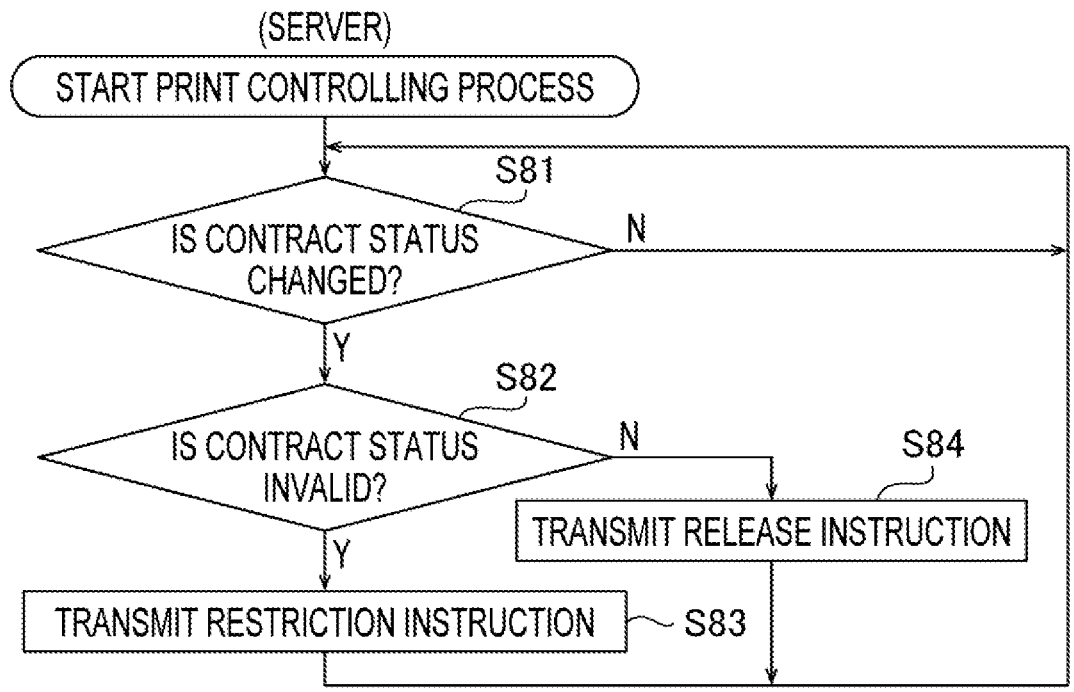
FIG. 9A is a flowchart illustrating a print control process executed by the server.
Figure 9B:
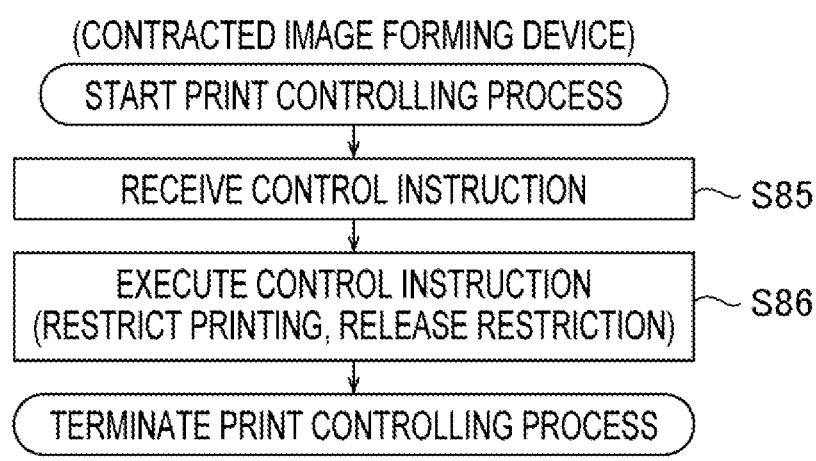
FIG. 9B is a flowchart illustrating a print control process executed by the contacted image forming device.

FIG. 9A is a flowchart illustrating a print controlling process executed by the server 4, and FIG. 9B is a flowchart illustrating a print controlling process executed by the contracted image forming device 1. The print control processes shown in FIGS. 9A and 9B are processes in which the server 4 controls printing in the contracted image forming device 1 in the contracted mode. Concretely, the server 4 can perform control to permit or restrict printing using the contract toner cartridge 3 in the contracted image forming device 1.

Process of Server

In the print control process shown in FIG. 9A, the server 4 detects a contract change detecting process (S81) to detect the change of the "contract status" in the registration information 451. When a contract default occurs, such as a delay in payment by the user or a violation of terms and conditions, the administrator of server 4 changes the "contract status" in the registration information 451 from "valid" to "invalid." Further, when the contract default is resolved, the administrator changes the "contract status" from "invalid" to "valid." In the contract change detecting process (S81), the server 4 detects whether or not such a change in the "contract status" has occurred. If the change is detected by the contract change detecting process (S81), the server 4 executes a validity determining process S82.

The validity determining process (S82) is a process of determining whether or not the "contract status" is invalid. When it is determined, in the validity determining process (S82), that the "contract status" is invalid, the server 4 executes a restriction instruction transmitting process (S83). The restriction instruction transmitting process S83 is a process of transmitting a restriction instruction to the contracted image forming device 1 of which "contract status" has been changed from valid to invalid. The restriction instruction is one of control instructions, and is an instruction that causes the contracted image forming device 1 to restrict printing using the contracted toner cartridge 3.

When it is determined, in the validity determining process (S82), that the "contract status" is not invalid (i.e., valid), the server 4 performs a release instruction transmitting process (S84). The release instruction transmitting process (S84) is a process to transmit a release instruction to the contracted image forming device 1 of which "contract status" has been changed from invalid to valid. The release instruction is one of the control instructions, and is an instruction that causes the contracted image forming device 1 to release the restriction on printing using the contracted toner cartridge 3.

Process of Contracted Image Forming Device

The controller 29 executes an instruction receiving process (S85) to receive control instructions transmitted by the server 4. The control instruction received by the controller 29 is either the restriction instruction transmitted in the restriction instruction transmitting process (S83) or the release instruction transmitted in the release instruction transmitting process (S84).

When receiving of the control instruction has been completed, the controller 29 executes the print controlling process (S86) according to the received control instruction. Concretely, when the restriction instruction is received in the instruction reception process (S85), the controller 29 executes the print controlling process to restrict printing using the contracted toner cartridge 3. As a result, the contracted image forming device 1 enters an error status in which printing using the contracted toner cartridge 3 is restricted. When in the error status, the contracted image forming device 1 may prohibit printing using the contracted toner cartridge 3. Alternatively, when in the error status, the contracted image forming device 1 may display a particular error screen on the display 23. It is noted that the contracted image forming device 1 may permit printing using the normal toner cartridge 3 even in the case of an error condition.

When the release instruction is received in the instruction receiving process (S85), the controller 29 executes a print controlling process (S86) to release the restriction on printing using the contracted toner cartridge 3. As a result, the error status of the contracted image forming device 1 is released, and the contracted image forming device 1 is in a status where printing using the contracted toner cartridge 3 is permitted. Thus, in the image forming system 100, depending on the validity of the contract managed based on the registration information 451, whether printing using the contract toner cartridge 3 in the contracted image forming device 1 is permitted or not can be controlled.

Modifications

Although the embodiment according to the present disclosures has been described above, the present disclosures are not necessarily limited to those described above, but various modifications can be considered.

In the image forming system 100 according to the above-described embodiment, the server 4 counts the number of printed sheets which are printed by the contracted image forming device 1 using the contracted toner cartridge 3, thereby managing the printing in the target contracted image forming device 1. However, the configuration according to which server 4 manages the printing in the contracted image forming device 1 is not necessarily limited to above. For example, the server 4 may be configured to register the remaining toner amount of the contract toner cartridge 3 used in the contracted image forming device 1 in the registration information 451. Then, in the number of printed sheets updating process (S55 of FIG. 6B) in the number of sheets printed in the scheduled transmission/reception process, the remaining toner amount for the target contracted image forming device 1 may be updated based on the remaining amount information 315. In this way, by managing the remaining toner amount of the contracted toner cartridge 3 used in the contracted image forming device 1, the server 4 can manage the printing in the contracted image forming device 1.

In the above-described embodiment, the controller 29 is described to have two operation modes, which are the normal mode and the contracted mode. However, the controller 29 may have three or more operation modes. In such a case, the type information 313 may represent any of the three or more operation modes.

In the above embodiment, the server 4 performs the counting of the number of sheets printed in the target contracted image forming device 1 using the contract toner cartridge 3. The configuration may be modified such that the contracted image forming device 1 performs the counting of the number of sheets printed using the contracted toner cartridge 3, and transmits the number of sheets printed within a preset period defined in the contracting process (S1) to the server 4.

The life information of the toner cartridge 3 is not necessarily limited to the remaining amount information 315, but can be a page count (i.e., the number of printed sheets) that is counted according to the use of the toner cartridge 3 or a dot count representing the amount of toner which is counted in the printing process or the like using the toner cartridge 3. Alternatively, in the usage information transmitting process (S51 of FIG. 6A), the contracted image forming device 1 may transmit the "page count" or "dot count" to the server 4 as usage information. In this case, the server 4 may determine whether the "page count" or "dot count" exceeds a particular threshold value in the life determining process (S56).

Although detailed description has been made, the above description is in all aspects illustrative, and aspects of the disclosures are not necessarily limited thereto. It is understood that countless modifications not illustrated may be envisioned without departing from aspects of the present disclosures. Each of the configurations described in each of the above embodiments and modifications can be combined or omitted as appropriate as long as they do not contradict each other.

What is claimed is:

1. An image forming system, comprising:
a server; and
an image forming device,
wherein the image forming device is configured to communicate with the server via a network and comprises:
a main body;
a consumable cartridge detachably attached to the main body, the consumable cartridge having a consumable memory configured to store type information indicating a particular operation mode;
a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information; and
a print mechanism configured to perform a printing process based on control by the controller,
wherein the server is configured to perform:
an operation mode changing request obtaining process of obtaining an operation mode changing request to change an operation mode of the controller to one of the first mode and the second mode; and
an operation mode changing instruction transmitting process of transmitting an operation mode changing instruction to set the operation mode of the controller to one of the first mode and the second mode in accordance with the operation mode changing request obtained in the operation mode changing request obtaining process, and
wherein the controller is configured to perform an operation mode setting process of setting of the operation mode in accordance with the operation mode setting instruction transmitted in the operation mode changing instruction transmitting process.

2. The image forming system according to claim 1, wherein the controller is configured to perform a consumable information transmitting process of reading the type information from the consumable memory and transmitting the read type information to the server when the operation mode is set to the second mode in the operation mode setting process.

3. The image forming system according to claim 2, wherein the controller is configured to perform:
an exchange determining process of determining whether the consumable cartridge is exchanged; and
the operation mode changing instruction transmitting process when determining that the consumable cartridge is exchanged in the exchange determining process.

4. The image forming system according to claim 3, wherein the server is configured to perform:
a first type determining process of determining a type indicated by the type information transmitted from the controller; and
a management starting process of starting management of printing by the image forming device using the consumable cartridge when determining that the type information indicates the second mode in the first type determining process.

5. The image forming system according to claim 4, wherein the management starting process includes a process to start counting of printed sheets printed by the image forming device.

6. The image forming system according to claim 4, wherein the server is configured to perform:
a management termination process of terminating the management of the image forming device when determining that the type information indicates the first mode in the first type determining process executed after the management starting process; and
a management resuming process of resuming the management of the image forming device when determining that the type information indicates the second mode in the first type determining process executed after the management starting process.

7. The image forming system according to claim 2, wherein the controller is configured to perform a number of printed sheets transmitting process of transmitting, to the server, a number of printed sheets printed using the consumable cartridge when the operation mode is set to the second mode in the operation mode setting process, and
wherein the server is configured to perform a printed sheets counting process of counting the number of printed sheets transmitted in the number of printed sheets transmitting process.

8. The image forming system according to claim 7, wherein the server is configured to perform:
an upper limit setting process of setting an upper limit of a printable number of sheets for the image forming device corresponding to the operation mode changing request; and
a billing process of charging for the image forming device when the number of printed sheets counted in the printed sheets counting process exceeds the upper limit of the printable number of sheets set in the upper limit setting process.

9. The image forming system according to claim 7, wherein the server is configured to perform:
a second type determining process of determining a type indicated by the type information transmitted from the controller in the consumable information transmitting process; and
terminating the printed sheets counting process when determining that the type information indicates the first mode in the second type determining process.

10. The image forming system according to claim 1, wherein the controller is configured to perform:
a communication determining process of determining whether communication with the server is available when the operation mode is set to the second mode in the operation mode setting process;
a number of printed sheets determining process of determining whether the number of printed sheets printed using the consumable cartridge that the type information indicates the second mode exceeds a permitted number of sheets set in advance when determining that the communication with the server is not available in the communication determining process; and a first error process of setting the image forming device in an error state when determining that the number of printed sheets printed exceeds the permitted number of sheets in the number of printed sheets determining process.

11. The image forming system according to claim 10, wherein the server is configured to perform:
    an upper limit setting process of setting an upper limit of a printable number of sheets for the image forming device based on the operation mode changing request; and
    a permitted number of sheets transmitting process of determining the permitted number of sheets based on the upper limit of the printable number of sheets set in the upper limit setting process and transmitting the permitted number of sheets to the server.

12. The image forming system according to claim 4, wherein the server is configured to perform:
    a registration process of registering validity of contract of the image forming device managed in the management starting process;
    a first validity determining process of determining the validity of contract of the image forming device managed in the management starting process;
    a restriction instruction transmitting process of transmitting a restriction instruction to restrict printing to the controller of the image forming device when determining that the validity of contract is invalid in the first validity determining process;
    a second validity determining process of determining the validity of contract of the image forming device to which the restriction instruction is transmitted in the restriction instruction transmitting process; and
    a release instruction transmitting process of transmitting, to the controller of the image forming device, a release instruction to release the restriction on printing when determining that the validity of contract is valid in the second validity determining process.

13. The image forming system according to claim 2, wherein the controller is configured to perform:
    a communication determining process of determining whether communication with the server is available when the operation mode is set to the second mode in the operation mode setting process;
    a third type determining process of determining a type indicated by the type information stored in the consumable memory when determining that the communication with the server is not available; and
    a second error process of setting the image forming device in an error state when determining that the type information indicates the second mode in the third type determining process.

14. The image forming system according to claim 4, wherein the controller is configured to perform a life information transmitting process of transmitting, to the server, life information representing a life of the consumable cartridge at a particular timing when the operation mode is set to the second mode in the operation mode setting process.

15. The image forming system according to claim 14, wherein the server is configured to perform:
    a life determining process of determining whether the life information, which is transmitted from the controller of the image forming device managed in the management starting process to the server in the life information transmitting process, exceeds a threshold value; and
    a delivery arranging process of arranging delivery of a new consumable cartridge that the type information indicates the second mode when determining that the life information exceeds the threshold value.

16. The image forming system according to claim 15, wherein the server is configured to terminate the delivery arranging process when determining that the type information indicates the first mode in the first type determining process.

17. The image forming system according to claim 15, wherein the consumable information transmitting process includes transmitting consumable information identifying the consumable cartridge to the server,
    wherein the delivery arranging process includes:
        a consumable information storing process of storing, in the server, the consumable information transmitted in the consumable information transmitting process when determining the life information exceeds the threshold value in the life determining process; and
        a consumable information determining process that the server determines whether the consumable information transmitted from the controller matches the consumable information stored in the consumable information storing process when determining the life information exceeds the threshold value in the life determining process,
    wherein the server is configured to arrange delivery of the consumable cartridge when determining, in the consumable information determining process, that the consumable information transmitted from the controller matches the consumable information stored in the consumable information storing process.

18. The image forming system according to claim 15, wherein the consumable cartridge includes a casing configured to contain a printing material,
    wherein the life information includes remaining amount information representing remaining amount of the printing material contained in the casing,
    wherein the life determining process includes determining whether the remaining amount represented by the remaining amount information is below a threshold amount, and
    wherein the delivery arranging process includes arranging delivery of the new consumable cartridge that the type information indicates the second mode when determining that the remaining amount represented by the remaining amount information is below the threshold amount in the life determining process.

19. A server configured to communicate with an image forming device via a network and comprises,
    wherein the image forming device includes:
        a main body;
        a consumable cartridge detachably attached to the main body, the consumable cartridge having a consumable memory configured to store type information indicating a particular operation mode; and
        a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information, and wherein the server is configured to perform:
- an operation mode changing request obtaining process of obtaining an operation mode changing request to change an operation mode of the controller to one of the first mode and the second mode; and
- an operation mode changing instruction transmitting process of transmitting an operation mode changing instruction to set the operation mode of the controller to one of the first mode and the second mode in accordance with the operation mode changing request obtained in the operation mode changing request obtaining process.

20. An image forming device configured to communicate with a server via a network,
wherein the image forming device comprises:
- a main body;
- a consumable cartridge detachably attached to the main body, the consumable cartridge having a consumable memory configured to store type information indicating a particular operation mode;
- a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information; and
- a print mechanism configured to perform a printing process based on control by the controller, and wherein the controller is configured to perform an operation mode setting process of setting of the operation mode in accordance with an operation mode setting instruction to set the operation mode of the controller to one of the first mode and the second mode.

21. A management method for a server configured to manage an image forming device communicable with the server,
wherein the image forming device comprises:
- a main body;
- a consumable cartridge detachably attached to the main body, the consumable cartridge having a consumable memory configured to store type information indicating a particular operation mode; and
- a controller configured to perform a process corresponding to any of a first mode and a second mode, the first mode being a mode in which the server does not manage printing using the consumable cartridge in accordance with the type information, the second mode being a mode in which the server manages printing using the consumable cartridge in accordance with the type information, and wherein the management method includes:
- an operation mode changing request obtaining step that the server obtains an operation mode changing request to change an operation mode of the controller to one of the first mode and the second mode;
- an operation mode changing instruction transmitting step that the server transmits an operation mode changing instruction to set the operation mode of the controller to one of the first mode and the second mode in accordance with the operation mode changing request obtained in the obtaining; and
- an operation mode setting step that the controller sets the operation mode in accordance with the operation mode setting instruction.

* * * * *